United States Patent
Aylon et al.

(10) Patent No.: US 10,352,476 B2
(45) Date of Patent: Jul. 16, 2019

(54) GAS PURGE VALVE WITH ACTUATION SENSOR

(75) Inventors: Moshe Aylon, Nofit (IL); Yoel Bahalul, M.P. Jordan Valley (IL)

(73) Assignee: A.R.I. FLOW CONTROL ACCESSORIES LTD., D.N. Ramat Hagolan (IL)

( * ) Notice: Subject to any disclaimer, the term of this patent is extended or adjusted under 35 U.S.C. 154(b) by 0 days.

(21) Appl. No.: 13/997,676

(22) PCT Filed: Jan. 24, 2012

(86) PCT No.: PCT/IL2012/050023
§ 371 (c)(1),
(2), (4) Date: Jun. 25, 2013

(87) PCT Pub. No.: WO2012/101640
PCT Pub. Date: Aug. 2, 2012

(65) Prior Publication Data
US 2013/0306157 A1 Nov. 21, 2013

Related U.S. Application Data

(60) Provisional application No. 61/435,817, filed on Jan. 25, 2011.

(51) Int. Cl.
*E03B 7/00* (2006.01)
*F16K 37/00* (2006.01)
(Continued)

(52) U.S. Cl.
CPC ............ *F16K 37/005* (2013.01); *E03B 7/003* (2013.01); *E03B 7/07* (2013.01); *E03F 5/08* (2013.01);
(Continued)

(58) Field of Classification Search
CPC .... F16K 37/0083; F16K 24/042; F16K 31/22; E03B 7/003
(Continued)

(56) References Cited

U.S. PATENT DOCUMENTS 3,027,916 A * 4/1962 Smith .................. F16K 17/087
137/557
3,586,015 A * 6/1971 Kitzner ................. B65D 90/34
137/199
(Continued)

FOREIGN PATENT DOCUMENTS

CN 2032213 U 2/1989
CN 201193346 Y 2/2009
(Continued)

OTHER PUBLICATIONS

The International Search Report for International Application No. PCT/IL2012/050023, two pages, dated Apr. 27, 2012.
The CN Search Report, 1 page, dated Apr. 28, 2014.

*Primary Examiner* — Angelisa L. Hicks
(74) *Attorney, Agent, or Firm* — Vorys, Sater, Seymour & Pease LLP (57) ABSTRACT

A gas purge valve (114A-D) is provided within a fluid system, the valve being configured with one or more sensors (134B) each for sensing and generating one or more signals indicative of parameters associated with the valve. The fluid system further comprises a power source and a transmitting system for transmitting signals from the sensors to a remote control station (130).

11 Claims, 8 Drawing Sheets

(51) Int. Cl.
  *E03B 7/07* (2006.01)
  *F16K 31/22* (2006.01)
  *E03F 5/08* (2006.01)
  *E03F 7/00* (2006.01)

(52) U.S. Cl.
  CPC ............... *E03F 7/00* (2013.01); *F16K 31/22* (2013.01); *F16K 37/0041* (2013.01); *E03F 2201/20* (2013.01); *Y10T 137/0318* (2015.04); *Y10T 137/8158* (2015.04)

(58) Field of Classification Search
  USPC .................................................. 137/202, 554
  See application file for complete search history.

(56) References Cited

U.S. PATENT DOCUMENTS

| | | | | |
|---|---|---|---|---|
| 3,665,156 | A * | 5/1972 | Lee ................. | H01H 35/30 |
| | | | | 137/202 |
| 5,144,977 | A | 9/1992 | Eggerton et al. | |
| 5,329,465 | A * | 7/1994 | Arcella et al. ................. | 702/184 |
| 5,616,829 | A * | 4/1997 | Balaschak et al. ............... | 73/46 |
| 5,685,697 | A * | 11/1997 | Buchanan, Jr. ......... | B60T 17/02 |
| | | | | 137/554 |
| 5,979,493 | A * | 11/1999 | Simpkins, Jr. .......... | F16K 17/20 |
| | | | | 137/487.5 |
| 6,276,390 | B1 * | 8/2001 | Perkins .................. | 137/202 |
| 6,725,179 | B1 * | 4/2004 | Nagase .................. | 702/188 |
| 6,819,292 | B2 | 11/2004 | Winter | |
| 7,617,838 | B2 | 11/2009 | Katzman et al. | |
| 7,950,377 | B2 | 5/2011 | Busato et al. | |
| 2002/0145568 | A1 | 10/2002 | Winter | |
| 2004/0104367 | A1 * | 6/2004 | Parsons et al. ........ | 251/129.04 |
| 2008/0156121 | A1 * | 7/2008 | Radomsky et al. ......... | 73/865.8 |
| 2008/0197995 | A1 * | 8/2008 | Taki .................... | B60C 23/0433 |
| | | | | 340/447 |
| 2009/0062932 | A1 * | 3/2009 | Caldwell et al. ............... | 700/11 |
| 2009/0303057 | A1 * | 12/2009 | Brown .................. | 340/605 |
| 2009/0306830 | A1 * | 12/2009 | Cummings et al. ......... | 700/282 |
| 2010/0059128 | A1 * | 3/2010 | Reck .................... | F16K 5/0605 |
| | | | | 137/597 |
| 2010/0269632 | A1 | 10/2010 | Dlugoss | |

FOREIGN PATENT DOCUMENTS

| | | |
|---|---|---|
| CN | 101501380 A | 8/2009 |
| CN | 101641654 A | 2/2010 |
| DE | 43 17 084 A1 | 11/1994 |
| SU | 667757 A1 | 6/1979 |
| WO | WO 8905938 A1 * | 6/1989 |
| WO | 2008/090359 A2 | 7/2008 |
| WO | WO 2008114120 A1 * | 9/2008 |

* cited by examiner

GAS PURGE VALVE WITH ACTUATION SENSOR

FIELD OF THE DISCLOSED SUBJECT MATTER

This invention relates to gas purge valves, namely valves fitted on a fluid line and configured for regulating the ingress and egress of air (or other gas) and egress from the line. More particularly, the disclosed subject matter is concerned with improvements in such valves and in systems and methods utilizing same.

BACKGROUND OF THE DISCLOSED SUBJECT MATTER

Many liquid flow systems (water supply lines, sewage lines, and the like) and sewage pipe flow systems are so-called "dumb" systems, i.e. devoid of the ability to provide real-time information and parameters responsive to flow conditions in the relevant system, with no capabilities of communication and or reporting. In practice, monitoring of such liquid supply lines is performed mainly at a pump housing and at nearby liquid treatment equipment. This often results in that long pipelines, spread over hundreds of miles/kilometers, are not monitored by any systematic system.

Some valves are configured with sensing means. For example, US patent application publication US2010269632 discloses a fluid pressure control device that includes an actuator and a body configured to house the actuator. The body has an opening arranged to receive pressurized fluid. The fluid pressure control device additionally includes a pressure sensor incorporated into the body relative to the opening to sense fluid pressure and to generate an electrical signal indicative of the sensed pressure. Furthermore, the fluid pressure control device includes an integrated circuit incorporated into the body, and operatively connected to the pressure sensor. The integrated circuit includes a transceiver configured to communicate with an external device by transmitting the electrical signal indicative of the sensed fluid pressure to the external device and receiving a control signal from the external device. The integrated circuit additionally includes a driver configured to power the actuator in response to the control signal.

U.S. Pat. No. 6,819,292 discloses a meter register includes a register body having a rotatable drive shaft coupled thereto. A drive gear is attached to the drive shaft and at least one follower gear is rotatably attached to the register body and coupled to with the drive gear. An antenna is provided that includes a first electrically conductive sheet, a second electrically conductive sheet, and an axially extending leg electrically connected to the first electrically conductive sheet and the second electrically conductive sheet. A first electrically conductive sheet is spaced an axial distance away from the second electrically conductive sheet wherein at least a portion of the register body is sandwiched between the first electrically conductive sheet and the second electrically conductive sheet. The meter register can be attached to a meter body and, further, an auxiliary antenna can be attached to the meter register. Also disclosed is a method of operation of a utility measuring system that incorporates the above-described meter register.

SUMMARY OF THE DISCLOSED SUBJECT MATTER

According to the disclosed subject matter there is a fluid valve system comprising at least one valve unit configured with one or more sensors and a telecommunication system for transmitting signals generated by the one or more sensors responsive to parameters associated with fluid flow through the valve and conditions thereof. The sensing valve thus provides monitoring fluid flow parameters and functioning of the at least one valve unit and a fluid system in which said valve system is mounted.

The disclosed system, allows improving the speed and effectiveness of detection of flow problems and field repairs of fluid flow systems system. This means shorter delays, more warning and faster containment by increasing the speed of discovering and responding to system failures. Leakage, vandalism, interference, malfunctioning and/or other parameters will be sensed on-line and reported to the central data system.

In addition, the System facilitates data collection and monitoring of the relevant parameters of the fluid line and its near environment and surroundings, in a control center for more streamlined data utilization. Pressure, Temperature and other flow parameters can thus be monitored and reported on-line to a central data system.

The disclosed subject matter is concerned with a gas purge valve configured with one or more sensors each for sensing and generating one or more signals indicative of parameters associated with the valve, a power source and a transmitting system for transmitting signals to a remote control station.

According to a configuration of the disclosure, the gas purge valve is also configured with one or more sensors for sensing and generating one or more signals indicative of parameters associated with a fluid line coupled to said valve and surroundings of the valve, said signals transmitted to the remote control station. According to another aspect of the disclosed subject matter there is a fluid system comprising a fluid line fitted with at least one gas purge valve configured with one or more sensors each for sensing and generating one or more valve signals indicative of parameters associated with the valve and the fluid line and their surroundings, a power source and a transmitting system for transmitting signals to a remote control station.

Yet another aspect of the disclosed subject matter there is directed to a method for monitoring fluid flow through a fluid system comprising a fluid line fitted with at least one gas purge valve configured with one or more sensors each for sensing and generating one or more signals indicative of parameters associated with the valve and a fluid line and their surroundings, a power source and a transmitting system for transmitting signals to a remote control station. The method comprising generating one or more valve signals by the sensors and transmitting the valve signals to the remote control station.

The disclosed method can be suitable also for monitoring and controlling fluid flow through a fluid system comprising a fluid line fitted with at least one gas purge valve configured with one or more sensors each for sensing and generating one or more signals indicative of parameters associated with the valve and a fluid line and their surroundings, a power source and a transceiving system for transmitting/receiving signals to/from a remote control station; generating one or more valve signals by the sensors and transmitting the valve signals to the remote control station; generating respective control signals which in turn operate various switches and faucets of the valve.

The gas purge valve ('valve') is mounted external to the fluid line, either directly thereon or via a communicating pipe segment.

Any one or more of the following features and configurations, separately or in combination, can be associated with any aspect of the disclosed subject matter:

There is provided at least one processor unit for receiving the valve signals and generating respective control signals which in turn operate various parameters of the valve. The processor is a controlled or a stand-alone (independent) decision making unit.

The various parameters of the valve are controllable by electric controllers for governing fluid flow thorough the valve and/or through the main line;

The at least one processor unit can be configured at or adjacent the valve, or at the remote control station, wherein control signals are transmitted to a receiver at or adjacent the valve;

Valve signals can be of any type (analog, digital, pressure, etc.) and configured for sensing physical, environmental and electrical parameters in the line, on the line and outside the line;

Valve signals can sense a plurality of parameters, for example, any one or more of temperature (ambient, liquid, gas, etc.), pressure (liquid, air, etc.), leakage, humidity, noise, motion (vibrations, tempering, etc.), shock, chemicals or bacteria present at the flowing fluid etc.

Valve signals and/or control signals are stored at the memory unit at the valve or at the control station;

Signals can be transmitted between the valve and the control station by any communications protocol, e.g. wire or wireless communications, RF, etc.

The transmitter/receiver (transceiver) system can be have one or more antennas for this purpose;

The control signals can be configured for activating flow governing mechanisms of the valve, i.e. governing (fully or partially opening/closing) one or more fluid ports to the valve. The control signals can be generated by an autonomous processor unit ('decision making unit') and can be configured for manual overriding, i.e. by manually generating a control signal or manually transmitted from a control center;

The power source can be is a power cell (battery) integrated within the valve (in a liquid impermeable fashion; replaceable or chargeable), or externally provided;

The power source can be a power unit configured for converting other forms of energy into electric energy, e.g. a solar system, a liquid operated generator, conductive power source, fluid-flow turbine associated with the main fluid line, wind turbine, etc.;

Electronic circuitry of the system (e.g. batteries, processor, antennas) can be placed in a master box wired to the sensors and/or electric controllers;

The master box can be a unitary box or divided into two or more boxes;

said one or more master boxes cab be integrated within a housing od the valve;

The one or more sensors and the electronic circuitry can be modular and configured for retrofit to existing valves.

BRIEF DESCRIPTION OF THE DRAWINGS

In order to understand the disclosed subject matter and to see how it may be carried out in practice, examples will now be described, by way of non-limiting examples only, with reference to the accompanying drawings, in which.

DETAILED DESCRIPTION OF EMBODIMENTS

Figure 1A:
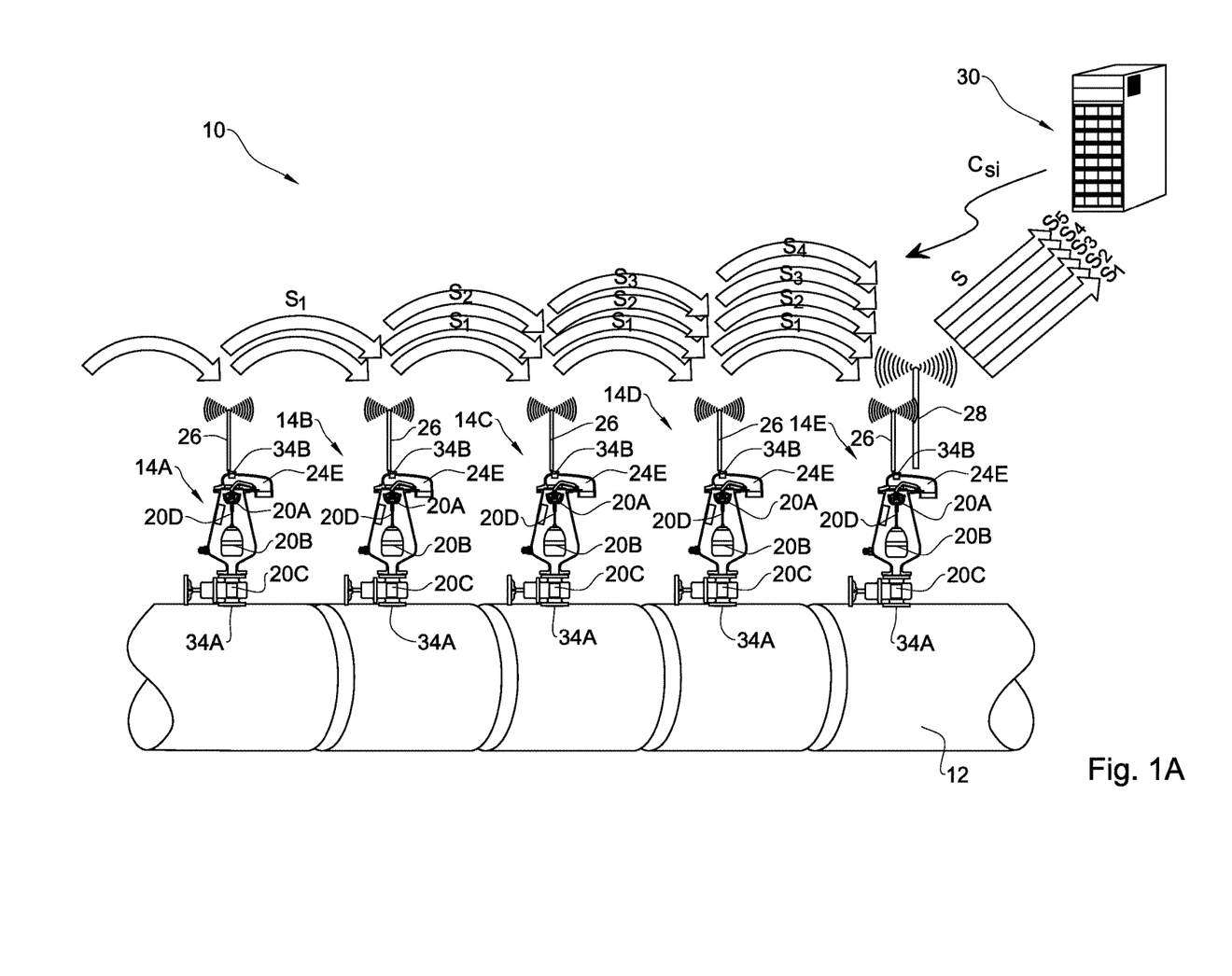
FIG. 1A is a front view of a sewage valve configured according to one aspect of the invention.

Illustrated in FIG. 1 there is a liquid supply system generally designated 10 illustrating a liquid supply line 12 (in the present example a sewage line) fitted with a plurality of sewage gas purge valves 14A to 14E (for example of the type disclosed in U.S. Pat. No. 7,617,838).

Each of the valves 14A to 14E is configured with a plurality of sensors 20A to 20D configured for sensing different parameters such as fluid flow, pressure, fluid temperature, ambient temperature, shocks, vibrations, tampering attempts, etc. It is however appreciated that the number of sensors, their positioning and their type is not restricted.

Further received within each of the valves 14 there is a power source in the form of a sealed battery pack. Whilst in the present example the battery pack is received within the valve, it should be appreciated that other power supply arrangements may be provided as well such as an external battery pack, electric line supply etc.

The configuration of the sensors and the transmitting arrangements to be discussed hereinafter, are of low current consumption and thus a battery pack received within the valve may last for many years, in several examples after about 15 years. Even more so, the battery pack may be replaceable or may be charged for example by an external electric port or by electric conduction.

Furthermore, each of the valves 14A to 14E is provided with a transmitter/receiver 24A to 24E with associated antennas 26.

In the present example, the arrangement is such that the first valve 14A transmits valve signals received from the various sensors 20A to 20D to the next in line valve, namely valve 14D which in turn transmits the information received from valve 14A, together with the information generated by the respective sensors of valve 14D to the next in line valve 14C and so on until the last in line valve 14E wherein the signals $S_1$ to $S_5$ from the respective valves 14A to 14E are transmitted to a remote control station designated 30 wherein the received signals are processed whereupon any control signal (command signals) may be generated and transmitted back to any of the respective valves 14A to 14E to perform a required action such as opening/closing an inlet to the valve or an outlet from the valve, changing flow parameters through the valve.

For this purpose, each of the valves 14A to 14E is configured also for receiving not only the valve signals of a preceding valve in line but also for receiving commands transmitted from the control unit 30 (which information may be transmitted directly to the relevant valve or through the chain of valves in a reverse direction) whereupon the respective command signal is transmitted and received at the addressed valve to perform a mechanic action by means of electric operated solenoids, electric faucets, etc. configured within each of the valves. In the present example, each valve is configured with an inlet electric faucet 34A and an outlet electric faucet 34B controllable by a control signal $C_s$ generated by the remote control unit 30.

Figure 1B:
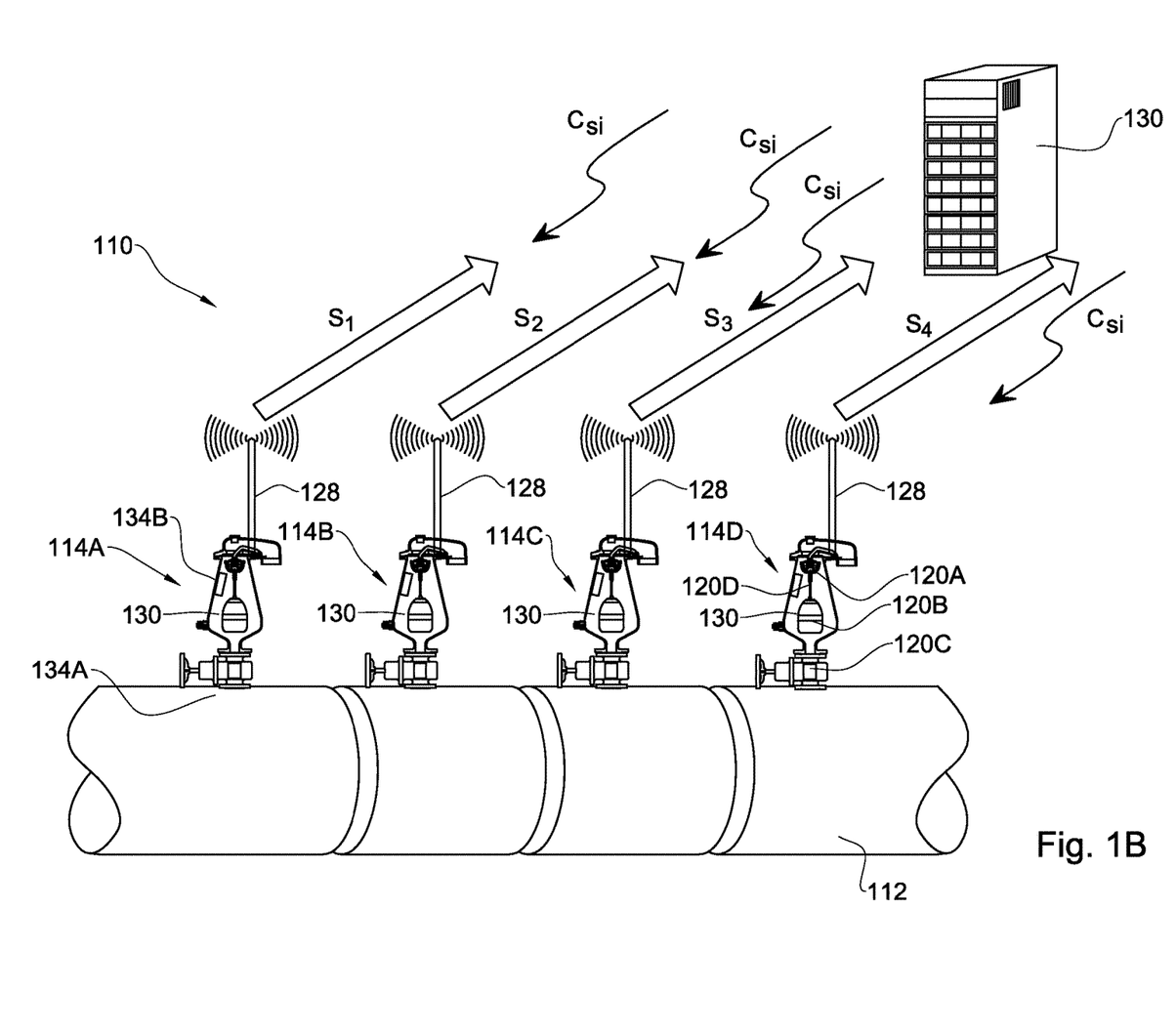
FIG. 1B is a sectioned side view of the sewage valve of FIG. 1A.

Turning now to FIG. 1B there is illustrated a flow control system generally designated 110 wherein a plurality of valves 114A to 114D are externally mounted over a sewage line 112. Each of the valves 114A to 114D is configured with a plurality of sensors 120A to 120D and likewise with a power source and transmitter/receiver unit collectively designated 130 associated with a respective antenna 128. Furthermore, each of the valves 114A to 114D is configured with an electric faucet 134A and 134B as discussed hereinabove in connection with the example of FIG. 1A.

In accordance with the example of FIG. 1B, each of the valves 114A to 114D is configured for direct transmitting of a respective signal $S_1$ to $S_4$ to the remote control unit 130 configured with a processor for receiving the valve signals from each of the respective sensors of each of the respective valves and generating respective control signals Csi.

As will be discussed hereinafter it is appreciated that the communication between the respective sensors and the control unit (either in accordance with the example of FIG. 1A or in accordance with the example of FIG. 1B, or in accordance with any other embodiment) may take place through different communication protocols and arrangements, e.g. RF communications, cellular communications, line communication, satellite communication, etc.

Figure 2A:
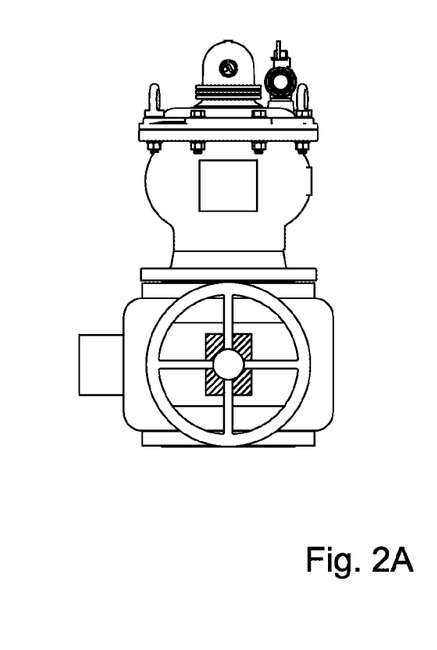
FIG. 2A is a front view of a purge valve configured according to one aspect of the invention.
Figure 2B:
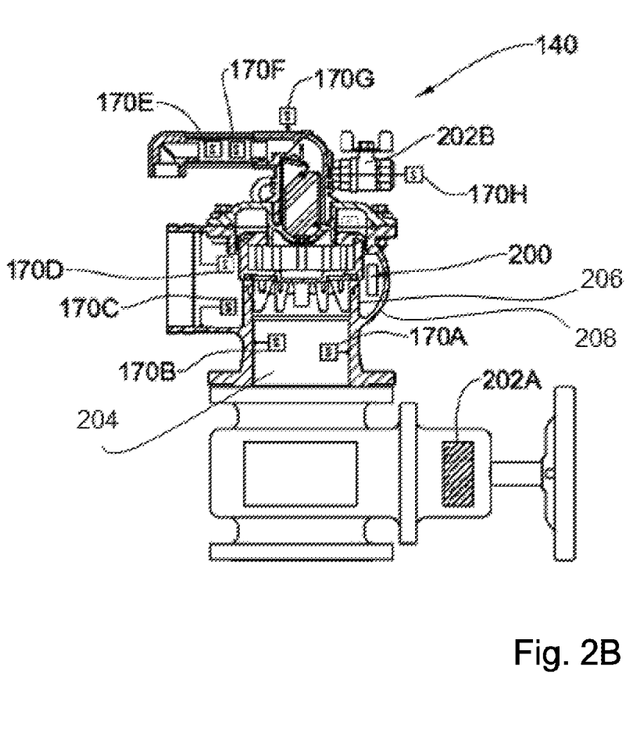
FIG. 2B is a sectioned side view of the sewage valve of FIG. 2A.
Figure 3A:
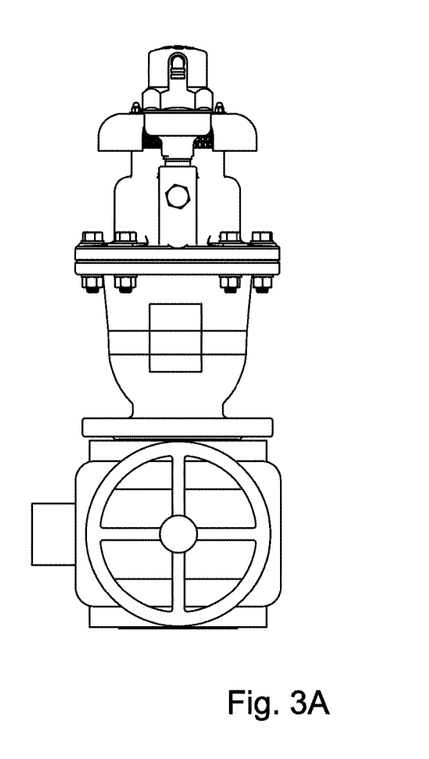
FIG. 3A is a front view of a different valve configured according to one aspect of the invention.
Figure 3B:
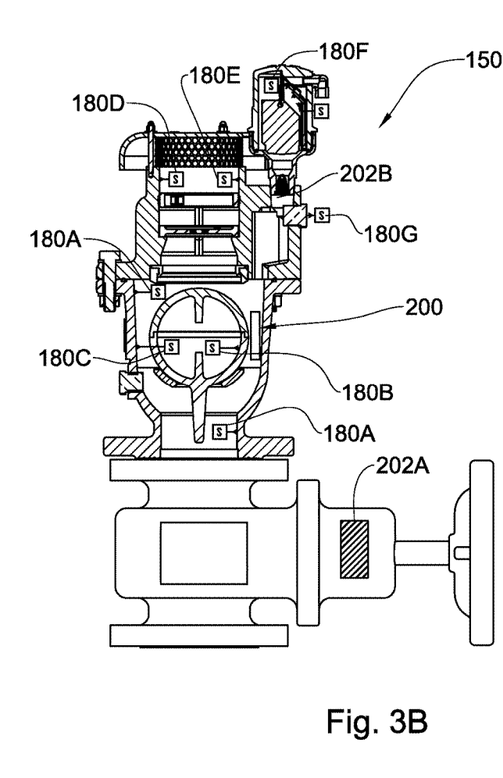
FIG. 3B is a sectioned side view of the sewage valve of FIG. 3A.
Figure 4A:
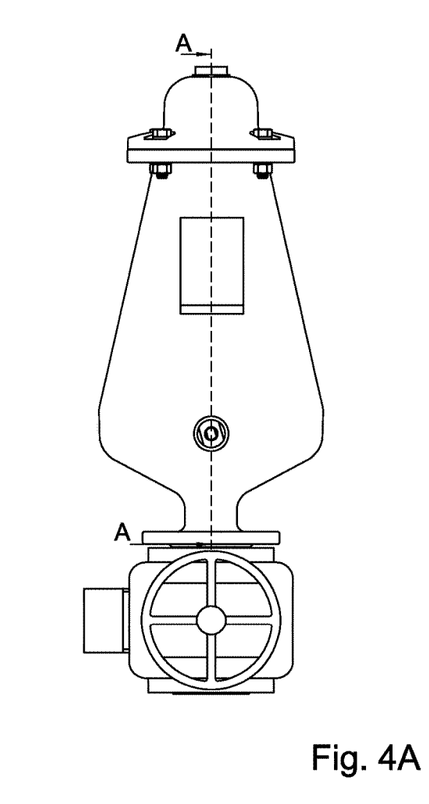
FIG. 4A is a communications scheme of a fluid control system according to another aspect of the present disclosed subject matter.
Figure 4B:
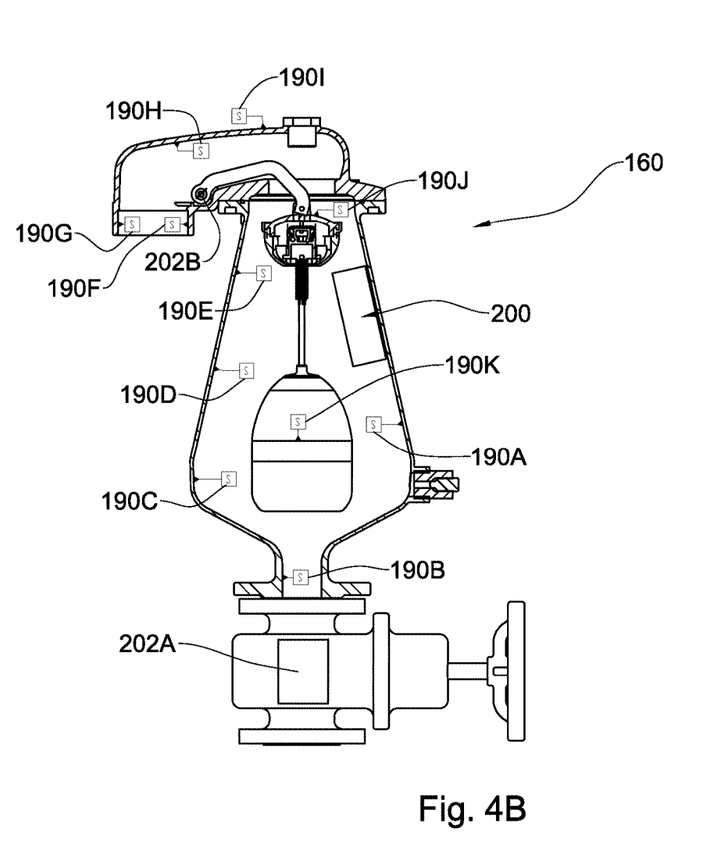
FIG. 4B is an alternative communications scheme of a communications and processor station according to an aspect of the present disclosed subject matter.

Further attention is now directed to the examples of FIGS. 2 to 4 illustrating several types of gas purge valves 140, 150 and 160, respectively. Each of these valves is configured for mounting over a liquid main supply line (not shown) and is configured with a plurality of various sensors indicated 170A to 170H, 180A to 180G and 190A to 190T, respectively. Each sensor is configured for sensing one or more particular parameter, as discussed hereinabove, e.g. fluid temperature, ambient temperature, flow rate, displacement, vibrations, toxic agents (chemicals, biological contamination, etc.) and so on.

Further there is provided a master box 200 in the form of a sealed pack accommodating electronics hardware and frameware, a power source (e.g. a battery pack), a transceiver and an antenna. Optionally, a microprocessor is included in the master box for receiving valve signals generated by the different sensors and control signals transmitted from a remote control unit, and responsive thereto manipulating electrically operated faucets and solenoids 202A and 202B. It is however appreciated that the master box may be a unitary item, or divided into several units interconnected. Furthermore, the one or more master boxes are integrally positioned within the housing of the valve. In one example, the housing defines an internal cavity that comprises a flow chamber 204, a control chamber 206, and a wall 208 disposed therebetween, where the master box 200 and all its electric circuitry are disposed within the control chamber 206.

Figure 5A:
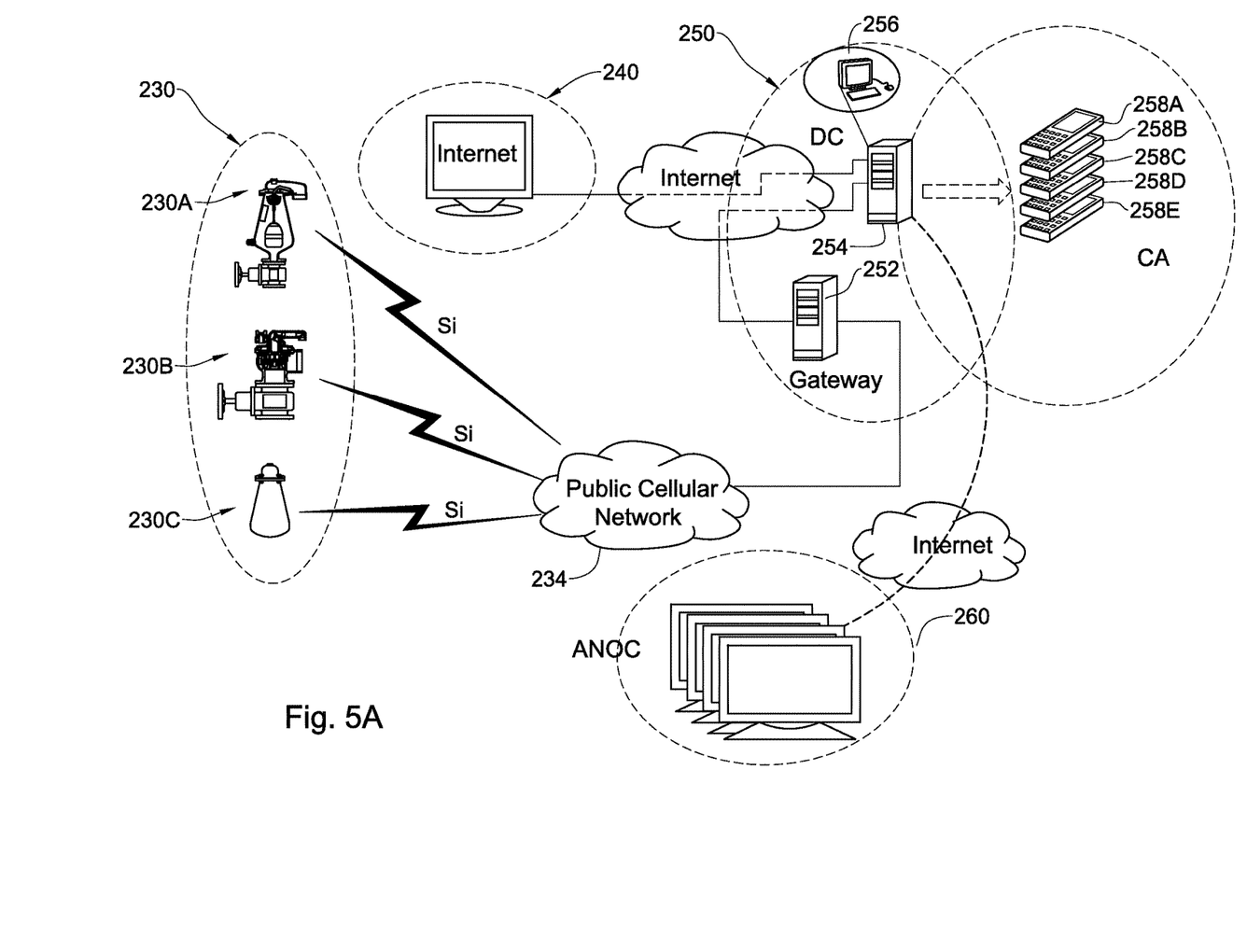
FIGS. 5A to 5C are schematic examples of valve systems according to the present disclosed subject matter.

In FIG. 5A there is exemplified a valve controlled system in accordance with an aspect of the invention, wherein a plurality of different types of valves ("end-users") designated collectively 230 being identical or different types of valves, transmits the respective signals designated Si through a public cellular network 234 whereby information is then transferred to a data center generally designated 250 and comprising a gateway 250 to a server 254 associated with a user interface 256, wherein information is transferred to a network operating the system 240 and to a plurality of nominated clients 258A to 258F e.g. in the form of hand held devices carried by personnel, e.g. cellular phones and the like.

Figure 5B:
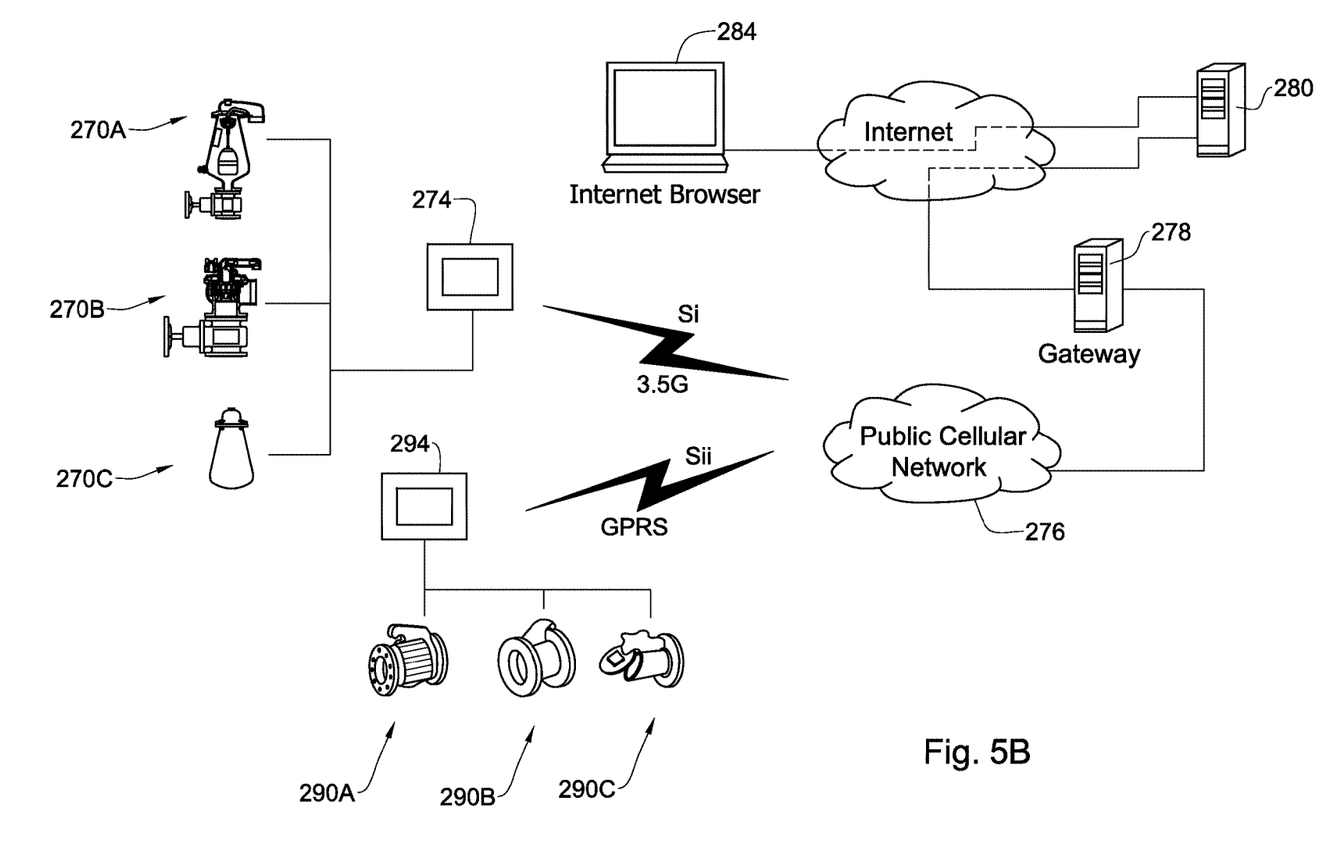

The example illustrated in FIG. 5B illustrates a fluid valve control system in accordance with an aspect of the present disclosed subject matter wherein a plurality of valves 270A to 270C are provided, said valve configured as disclosed in connection with the examples of the previous examples and configured for transceiving information through a cellular network via a cellular switch box 274 for transceiving signals Fi to a public cellular network 276 from where the information is transferred through a gateway 278 to a central service 280 connected by cellular or wire link or through the internet to a work station 284.

It is further noted that the example of FIG. 5B comprises a plurality of inline valves 290A, 290B and 290C also configured for transmitting valve signals through a cellular switch box 294 to the public cellular network 276, which signals $S_{ii}$ is then transmitted through the cellular network to the gateway and processed by the server 280 as mentioned above.

Figure 5C:
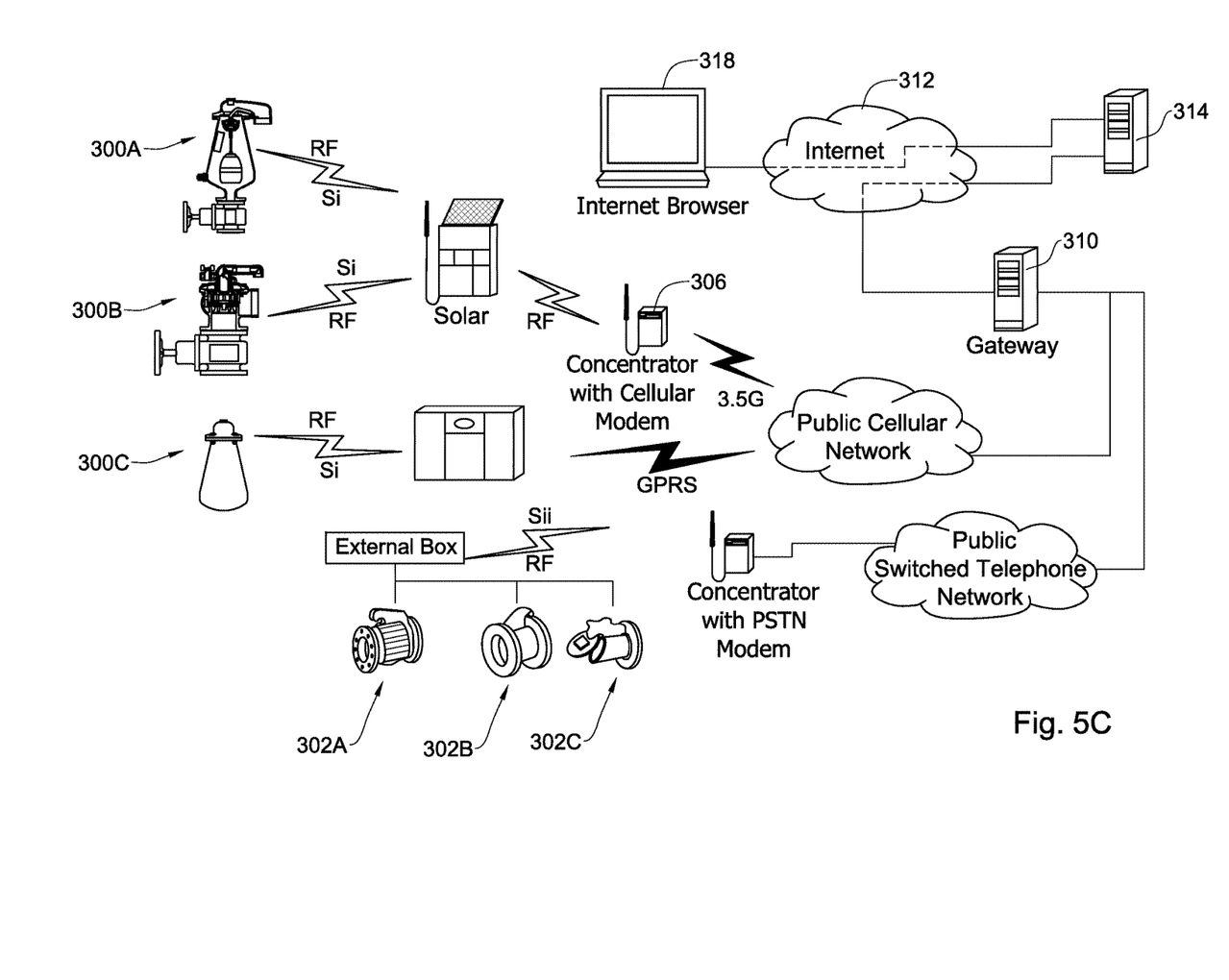

In the example of FIG. 5C there is illustrated a control valve system which as opposed to the previous example signals are transferred from the different gas purge valves 300A to 300C and from the inline valves 302A to 302C via RF transmission whereby an RF operator 306 then transceives the received signals (valve signals and control signals) to the gateway 310 wherefrom the information is then available at the 312 at a server 314 and a work station 318.

While there has been shown several examples of the invention, it is to be understood that many changes can be made therein without departing from the spirit of the invention, mutatis Mutandis.

The invention claimed is:

1. A gas purge valve comprising:
   a housing that defines an internal cavity comprising a flow chamber, a control chamber, and a rigid wall portion disposed therebetween, the wall portion being disposed inside the internal cavity and comprising a first side facing the flow chamber and an opposite second side facing the control chamber, the flow chamber having an inlet and an outlet;
   a first one or more sensors disposed wholly within the flow chamber and being acted upon by a fluid within the flow chamber, the first one or more sensors each for sensing and generating a first one or more signals indicative of parameters associated with the fluid within the flow chamber of the valve and a fluid line coupled to the valve;
   a second one or more sensors for sensing and generating a second one or more signals indicative of parameters associated with surroundings of the valve; and
   an electronic circuitry disposed inside of the control chamber and integrated within the housing, the electronic circuitry comprising a power source, a processor, and a transmitting/receiving system comprising at least one antenna, the transmitting/receiving system configured for:
      transmitting the first and the second one or more signals to a remote control station via the at least one antenna,
      receiving valve signals from a second valve in line, transmitting the valve signals received from the second valve in line to a third valve in line or to the remote control station,
receiving one or more control signals from the remote control station, and
transmitting the one of more control signals to the second valve.

2. A fluid system comprising a fluid line fitted with at least one gas purge valve of claim 1.

3. The fluid system according to claim 2, comprising at least one processor unit for receiving and processing the first and the second one or more signals, generating said one or more control signals which in turn operate various parameters of the valve, and transmitting said one or more control signals to the valve.

4. The fluid system according to claim 3, wherein said one or more control signals are configured for activating flow governing mechanisms of the valve to thereby open and close one or more fluid ports to the valve.

5. The gas purge valve according to claim 1, wherein said wall portion is substantially flat.

6. A method for monitoring fluid flow through a fluid system comprising a fluid line fitted with at least one gas purge valve comprising: a housing; a first one or more sensors disposed within the housing, the first one or more sensors each for sensing and generating a first one or more signals indicative of parameters associated with a fluid within the flow chamber of the valve and the fluid line; a second one or more sensors for sensing and generating a second one or more signals indicative of parameters associated with surroundings of the valve; a power source and a transmitting/receiving system for transmitting said first and second one or more signals to a remote control station via at least one antenna, wherein an electronic circuitry of the valve comprising the power source, a processor, the at least one antenna, and the transmitting/receiving system, is integrated within the housing; the method comprising steps of: generating the first and second one or more signals by the sensors; transmitting the first and second one or more signals to the remote control station; receiving valve signals from a second valve in line; transmitting the valve signals received from the second valve in line to a third valve in line or to the remote control station; receiving one or more control signals from the remote control station; and transmitting the one or more control signals to the second valve,
wherein the housing defines an internal cavity comprising a flow chamber, a control chamber and a rigid wall portion disposed therebetween, the wall portion being disposed inside the internal cavity and comprising a first side facing the flow chamber and an opposite second side facing the control chamber, the flow chamber having an inlet and an outlet;
wherein the first one or more sensors are disposed wholly within the flow chamber and acted upon by the fluid within the flow chamber; and
wherein the electronic circuitry is disposed within the control chamber.

7. The method according to claim 6, further comprising:
receiving and processing the first and the second one or more signals at the remote control station;
generating said one or more control signals which in turn operate various parameters of the valve;
transmitting from the remote control station the one or more control signals to the valve; and
controlling fluid flow through the fluid system based on the one or more control signals.

8. The method according to claim 6, wherein said wall portion is substantially flat.

9. A gas purge valve comprising:
a valve housing defining an internal cavity comprising a flow chamber, a control chamber and a rigid wall portion disposed therebetween, the flow chamber having an inlet and an outlet;
a first one or more valve sensors disposed wholly within the flow chamber and being acted upon by a fluid within the flow chamber, the first one or more valve sensors each configured or arranged for sensing and generating a first one or more valve signals indicative of parameters associated with the fluid within the flow chamber valve and with a fluid line coupled to the valve;
a second one or more valve sensors for sensing and generating a second one or more signals indicative of parameters associated with surroundings of the valve;
one or more electronically controlled valve mechanisms connected to or disposed within the valve;
an electronic valve circuitry disposed within the valve housing and operably connected to the first and/or second one or more valve sensors, the electronic valve circuitry comprising a valve processor;
a valve power source disposed within the valve housing, the valve power source configured or arranged to power the one or more electronically controlled valve mechanisms and the electronic valve circuitry; and
a valve transmitting/receiving system integrated within the valve housing, the valve transmitting/receiving system comprising an antenna for transmitting the first and the second one or more valve signals to a remote control unit via the antenna, receiving valve signals from a second valve in line, transmitting the valve signals received from the second valve in line to a third valve in line or to the remote control unit, receiving one or more control signals from the remote control unit for controlling the one or more electronically controlled valve mechanisms, and transmitting the one or more control signals to the second valve;
wherein the rigid wall portion is disposed inside the internal cavity and comprises a first side facing the flow chamber and an opposite second side facing the control chamber; and
wherein the electronic circuitry is disposed within the control chamber.

10. A gas purge valve system comprising the gas purge valve according to claim 9, further comprising the remote control unit having a remote control unit processor configured or arranged for receiving and processing said first and second one or more valve signals from said first and second one or more valve sensors, generating said one or more control signals for controlling said one or more electronically controlled valve mechanisms, and transmitting said one or more control signals to the valve.

11. The gas purge valve according to claim 9, wherein said wall portion is substantially flat.

* * * * *